June 9, 1925 — E. HOPKINSON — 1,540,885
PROCESS AND APPARATUS FOR OBTAINING RUBBER FROM LATEX
Filed Oct. 17, 1923
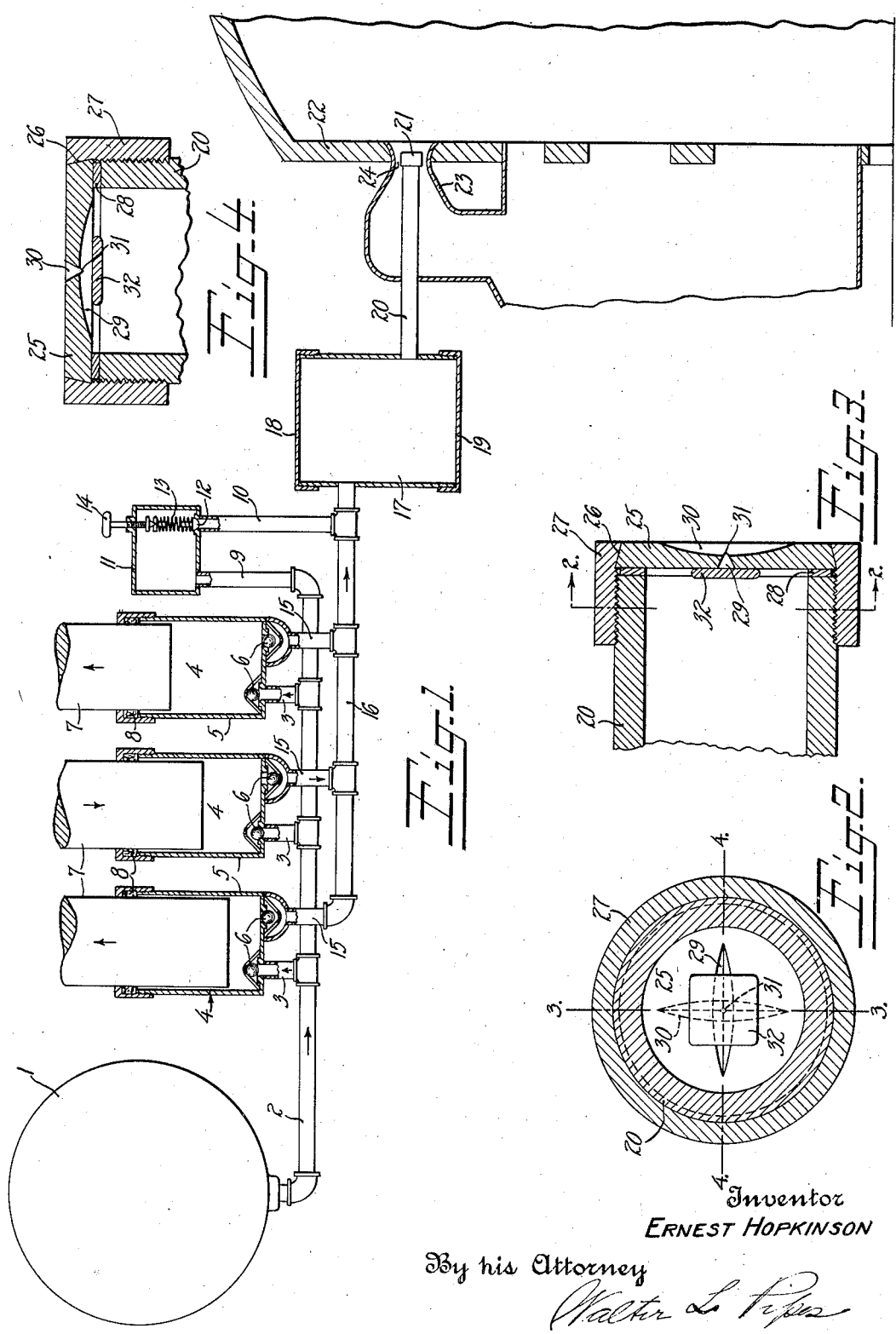
Inventor
ERNEST HOPKINSON
By his Attorney

Patented June 9, 1925.

1,540,885

UNITED STATES PATENT OFFICE.

ERNEST HOPKINSON, OF NEW YORK, N. Y.

PROCESS AND APPARATUS FOR OBTAINING RUBBER FROM LATEX.

Application filed October 17, 1923. Serial No. 669,007.

*To all whom it may concern:*

Be it known that I, ERNEST HOPKINSON, a citizen of the United States, residing at New York city, county of New York, and State of New York, have invented a certain new and useful Process and Apparatus for Obtaining Rubber from Latex, of which the following is a full, clear, and exact description.

This invention relates to a new and useful process and apparatus for obtaining rubber, balata, or gutta percha, from their latices.

The invention is a continuation-in-part of my prior application, Serial No. 326,276, filed September 25th, 1919, for "process for obtaining rubber-containing or similar materials".

It aims to provide a new and improved process and apparatus for obtaining rubber from latex, which is economical of labor, which may be carried on with simple apparatus not likely to get out of order, which is capable of operation in most any climate, which yields a more desirable material physically, which is flexible and adapted to small as well as large plantations or central stations, which may be practiced with unskilled labor, and which may be employed to substantially increase the yield of dried material. These are some of the objects of the invention, others will appear later in the unfolding of the specification.

With the illustrated embodiment in mind and without intention to limit the scope more than is required by the prior art, the invention consists in a process and apparatus for spraying the latex under pressure through a restricted orifice so as to project it in a finely divided condition into a drying chamber where the dispersed liquid particles are dried and collected.

An embodiment of the invention is illustrated in the accompanying drawings in which:—

Figure 1 is a diagrammatic elevation illustrating an arrangement of parts suitable for practicing the process;

Figure 2 is a section of the preferred form of nozzle on line 2—2 of Figure 3;

Figure 3 is a cross-section of the same on the line 3—3, Figure 2;

And Figure 4 is a cross-section of Figure 2 on the line 4—4.

According to the invention, and with the treatment of rubber-latex specifically in mind, the liquid material from any suitable source of supply, such as the tank 1, is conducted through a main 2 and branches 3 to one or more pumps, indicated generally by the numeral 4. There may be any suitable number of these pumps, such as the three illustrated, which are of substantially duplicate construction. While any convenient and serviceable form of pump may be utilized, the displacement type illustrated is preferred. These have a cylinder 5 and ball-valves 6, or valves of any other suitable construction, mounted in intake and outlet openings, respectively, a plunger or ram 7 being reciprocable within the cylinder through a gland or packing 8, preferably adjustable. Any suitable means may be used to operate the plungers 7, such as a crank-shaft with arms (not shown) arranged 120° apart. Such arrangement of the pumps permits the plungers to be operated at a relatively slow speed without heating consequent upon the friction between the plungers and the glands. The pumps are of a design and capacity to deliver a greater quantity of latex than escapes from the system and thereby permit developing a high pressure within the latex, as high, say, as 1,000 pounds per square inch.

To enable the pressure to be regulated, a by-pass is preferably provided, comprising the pipes 9 and 10, communicating with a casing 11, within which is mounted a valve 12 normally held closed by a spring 13, whose tension may be varied with a hand-operable stem 14. By suitably adjusting the tension of the spring 13, the pumps may be operated at a speed permitting the requisite pressure to be attained within the system. It is to be understood, however, that the pressure in the latex may be widely varied. At a pressure as low as 200 or 300 pounds, a spray or dispersion of the latex is obtained, but the size of the particles is considered larger than desirable for the best results from the standpoint of operation as well as of the physical characteristics of the final product. Any other suitable means for obtaining the desired pressure on the latex may be substituted in lieu of the pumps.

The normal discharge from the pumps is through the branches 15 to a main or header 16, which is preferably, but not necessarily, connected to a floatation and settling basin 17. This basin 17, if employed, is preferably equipped with removable end closures 18 and 19, through which coalesced particles of rubber, or bits of coagulum, may be removed from the top of the chamber, and relatively heavy foreign particles, such as bits of metal and dirt, may be removed from the bottom of the chamber. The removal, of course, would be effected when the system is not operating and infrequently, as the occasion may demand.

From the basin 17, the latex is conducted through a pipe 20 to a hydraulic nozzle 21 of any suitable and appropriate construction. These may be variously located so as to project the latex in a finely divided spray into any suitable form of drying chamber, a wall of which is indicated at 22. Preferably, the nozzles enter the drying chamber through a Venturi tube 23, of the form shown in cross-section, with clearness, as indicated at 24, permitting air or gas, which may be heated or not and under pressure or not, passing into the chamber so as to surround the spray more or less completely and carry it away from the walls or ceiling of the drying chamber. In this manner, deposit on the adjacent surfaces of the nozzles and chamber, due to eddy currents caused by the spray, may be diminished or prevented.

While any suitable and workable form of hydraulic pressure nozzle may be employed to finely divide the latex, it is preferred to utilize the type illustrated in the drawings. But it is to be understood that the invention in its broadest aspects is not limited to the specific construction disclosed. This preferred form of nozzle comprises essentially a disk 25 with bevelled edges 26, which are adapted to be engaged by the correspondingly sloped face of a collar 27 threaded to the pipe 20. Between the end of the pipe 20 and the disk 25 is preferably introduced a washer 28 of ductile metal, such as lead or copper, so as to seal the disk fluid-tight in position.

The disk 25 is, preferably, provided with notches 29 and 30 in its opposite faces, extending transversely one to the other and intersecting to form an orifice 31, more or less diamond-shaped as viewed at right angles to the plane of the disk. Preferably, but not necessarily, the notch 29 on the inside of the disk is partially blocked by a bar or plate 32, held in position in any suitable manner, as by being brazed to the disk. This bar insures the latex flowing to the orifice 31 in two opposed streams which impact one against the other in or opposite the orifice 31. In other words, the streams are directed against one another at a point opposite or in the orifice 31, which is in communication with the drying chamber, where the pressure is preferably that of the atmosphere or thereabouts, in any case, substantially and materially lower than the pressure on the latex within the system.

The drying chamber 22 may be constructed of any convenient materials and in any suitable size and shape. For large scale operation, it is preferred to employ the type of drying chamber disclosed in United States Patent to Bradley & Coffin, No. 1,428,526, granted September 12th, 1922, of circular or polygonal cross-section and having, desirably, side walls which flare outwardly downwardly so that the cross-section of the chamber increases from the top to the bottom. Such a construction diminishes or completely prevents deposit of the sprayed particles on the side walls of the chamber and allows them to be collected on the bottom thereof without substantial loss. In this type of chamber, the latex spray may be directed horizontally, vertically downward, or at any suitable angle, depending on the manner in which the nozzle or nozzles are disposed. For smaller plantations, however, the drying chamber may be made of greater length horizontally than vertically or of any suitable shape to meet the exigencies of the situation on a small plantation where facilities are poor. When using a horizontal chamber, the latex is preferably sprayed substantially horizontally.

The drying medium may be air, or an inert gas, the former preferably, which is heated either indirectly by radiation or directly by intermingling with the products of combustion from a furnace, such as that disclosed in the above-mentioned patent, but avail may be made of any other suitable form of furnace or means for heating the drying medium. The temperature of the drying medium, while variable, may be relatively high at the point of initial contact with the sprayed particles or as long as they contain appreciable moisture, but it is essential, or at least very desirable, not to allow the dried particles to attain a temperature substantially above 212° F. Generally, the volume and inlet temperatures of the drying gas should be so controlled that overheating of the dried particles will be avoided. The stated temperature, or a little lower, is safer if a uniform and satisfactory dried product is desired.

The dried particles of latex, or rather rubber, deposit on the floor of the chamber and may be removed in any suitable and convenient manner. Preferably, however, the floor is made movable so that the product may be continuously or intermittently withdrawn from the chamber while the spraying and drying operations proceed. Any suitable and convenient construction may be employed to this end, one such constituting the subject matter of a prior pending application of J. G. Coffin Serial No. 635,535, filed April 30, 1923.

The invention has been illustrated diagrammatically. It is to be understood that a battery of the nozzles is preferably employed about and near the top of the drying chamber, which is preferably constructed as disclosed in said patent to Bradley & Coffin No. 1,428,526, at least for large scale production. With this arrangement in mind, the operation of the process will now be described:—Latex from the tank 1 is drawn through the pumps 4 and forced into the system and sprayed from the nozzles 21. The pressure on the latex is preferably around 800 pounds, but the pressure may be varied widely and sufficiently fine dispersion of the latex into liquid particles may be attained at lower pressures, as already indicated. With the nozzle of the preferred construction illustrated and previously described in detail, the latex is conducted in opposed streams through the ducts defined by the notch 29 and bar 32 to the orifice 31, and there, by reason of their impact and sudden release into the drying chamber at atmospheric pressure, shattered or dispersed into fine liquid particles or a spray. The preferred construction of the nozzle yields a spray of fine and uniform particle size. And the spray is of a blade-like form, being wider in one direction than at right angles thereto, probably owing to the shape of the notch 30 in the discharge face of the disk 25. The preferred construction of nozzle also permits the pressure to be lowered materially without reducing to a stream or trickle, not satisfactorily susceptible of evaporation and drying in the drying chamber. This is commercially desirable as a dripping nozzle would be likely to clog and gum up. It has been observed that when the process is operating with the latex under 800 pounds pressure, for instance, the pressure has at times suddenly jumped to around 1,000 pounds, and then, fallen back to the normal pressure of 800 pounds, suggesting a temporary clogging and self-cleaning action. This is a valuable and practical feature, inasmuch as it would seem to permit continuous and uninterrupted spraying, and minimize or eliminate shut-downs.

The heated air, or gas, in the case of a vertical drying chamber is preferably conducted slowly from the top to the bottom of the chamber, as disclosed in the before-mentioned Bradley & Coffin patent, but it is to be understood that the drying medium may be passed slowly through a horizontal chamber when desired. Whatever be the form or shape of the chamber, it is necessary to provide a sufficient time interval between the ejection of the sprayed latex into the chamber and its deposit on the floor (stationary or movable) to allow the water content to be completely, or substantially completely, removed by evaporation. Obviously, the conditions that must be observed will vary with the shape of the drying chamber, the throw of the spray, and the velocity of the drying medium. But with the directions and conditions that have been stated, one skilled in the art may perform the process to meet the conditions with which confronted.

From what has been disclosed above, it will be seen that the process is practically fool-proof and may be carried on without skilled labor. By spraying the latex, which is itself under high pressure, substantial economies may be effected and, it is believed, the maximum capacity of a given size of drying chamber realized. The system for developing the pressure within the latex does not clog up at the valves, pumps, or nozzles. This is very desirable from an operating standpoint.

Prior to this invention, it has been considered impracticable to spray latex under the relatively high pressure required for a nozzle spraying by hydraulic pressure, and in fact, it has even been considered impossible to feed latex in a practical manner except under low pressure. One reason for this is that latex is easily coagulated by friction, and as a result, when pumped by an ordinary centrifugal or reciprocating pump, the coagulum induced by friction quickly clogs up the system. It will be seen that the rams 7 of Figure 1 operate without contact with the walls of cylinders 5, thereby substantially avoiding the formation of any coagulum within the cylinders.

It is to be understood that the invention is primarily concerned with the drying of natural rubber-latex (or the latices containing balata and gutta percha), but the latex may be mixed with any one or more other materials, liquid or solid, which it is desirable to compound, or intimately intermingle, with the rubber for any purpose whatsoever. In other words, the invention is not limited to the drying of natural latex as obtained from the trees, but comprehends compounded or altered forms of the natural fluid. The term "latex" is used in this sense in the claims.

It is to be understood that all changes and modifications capable of being made in the process or apparatus in the light of the art as it is known today are intended to be comprehended and reference is therefore made to the appended claims for a full understanding of the breadth and scope of the invention. In the claims, the expression "high pressure" is used to cover a substantial pressure, above 200 pounds to the square inch, greater than the pressure within the drying chamber into which the spray is ejected.

Having thus described my invention, what I claim and desire to protect by Letters Patent is:—

1. That method of obtaining rubber from latex which consists in, maintaining a supply of latex within a container under high pressure, ejecting it from the container in a finely divided condition into a drying chamber, and drying the particles while dispersed.

2. That method of obtaining rubber from latex which consists in, maintaining a supply of latex within a container under high pressure, ejecting it from the container in a finely divided condition into a drying chamber, drying the particles while dispersed, and amassing the dried particles.

3. That method of obtaining rubber from latex which consists in, maintaining a supply of latex within a container under high pressure, ejecting it from the container in a finely divided condition into a drying chamber, and drying the particles while dispersed in a heated gaseous medium.

4. That method of obtaining rubber from latex which consists in, maintaining a supply of latex within a container under high pressure, ejecting it from the container in a finely divided condition into a drying chamber, and drying the particles while dispersed in hot air mingled with the products of combustion from a furnace.

5. That method of obtaining rubber from latex which consists in, placing the latex under high pressure, spraying it under such pressure into a drying medium at approximately atmospheric pressure, and drying the wet particles while dispersed.

6. That method of obtaining rubber from latex which consists in, spraying the latex by the impact of opposed streams thereof at high pressure into a drying chamber at substantially less pressure, reducing the water content of the latex while the particles are dispersed, and amassing the dried particles.

7. That method of obtaining rubber from latex which consists in, directing opposed streams of latex under high pressure against each other, releasing the pressure substantially at the point of impact to thereby finely divide the latex, and drying the finely divided latex in a chamber containing a heated gaseous medium.

8. That method of obtaining rubber from latex which consists in, conducting opposed streams of latex under high pressure against each other, exploding the streams at substantially the point of impact to form a spray of dispersed particles, and drying the dispersed particles in an atmosphere of gas under moderate pressure approximating that of the atmosphere.

9. That method of obtaining rubber from latex which consists in, ejecting latex under high pressure in a dispersed form into a drying medium under approximately atmospheric pressure, and drying the particles of the latex while dispersed.

10. That method of obtaining rubber from latex which consists in, ejecting latex under high pressure in a dispersed form into a drying medium under approximately atmospheric pressure, drying the particles of the latex while dispersed, and amassing the dried particles.

11. That method of obtaining rubber from latex which consists in, conducting opposed streams of latex against each other at a pressure above 200 pounds, releasing the pressure substantially at the point of impact to thereby finely divide the latex, and drying the particles while in suspension in a heated gaseous medium.

12. That method of obtaining rubber from latex which consists in, spraying the latex under a hydraulic pressure greater than 200 pounds, and drying the particles while suspended in a gaseous drying medium.

13. A system for drying latex comprising supply means, means for feeding latex thereto under high pressure including a reciprocable element operating throughout its pressure exerting portion within the latex, means connected to the supply means for spraying the latex while under such pressure, and means for drying the sprayed latex in suspension.

Signed at New York city, county of New York, and State of New York, this 15th day of October, 1923.

ERNEST HOPKINSON.